(12) United States Patent
Xue (10) Patent No.: US 7,130,421 B2
(45) Date of Patent: Oct. 31, 2006

(54) SINGLE PIECE VERSATILE PHONE STAND

(75) Inventor: Bryce Xiaobo Xue, Acton, MA (US)

(73) Assignee: 3Com Corporation, Marlborough, MA (US)

( * ) Notice: Subject to any disclaimer, the term of this patent is extended or adjusted under 35 U.S.C. 154(b) by 256 days.

(21) Appl. No.: 10/673,726

(22) Filed: Sep. 29, 2003

(65) Prior Publication Data

US 2005/0069126 A1 Mar. 31, 2005

(51) Int. Cl.
*H04M 1/00* (2006.01)

(52) U.S. Cl. ............... 379/435; 379/447; 379/454

(58) Field of Classification Search ........... 379/435, 379/447, 454
See application file for complete search history.

(56) References Cited

U.S. PATENT DOCUMENTS

| | | | | |
|---|---|---|---|---|
| 4,617,428 A | * | 10/1986 | Gala et al. ............ | 379/435 |
| 5,432,836 A | * | 7/1995 | Jarrett ............... | 379/435 |
| 6,351,535 B1 | * | 2/2002 | Nogas et al. .......... | 379/436 |

* cited by examiner

*Primary Examiner*—Rasha S. Al-Aubaidi (57) ABSTRACT

A telephone unit has a housing with a stand pivot mount on a bottom side and with an interaction surface at a top side. A single piece stand is provided with a first end connected to the housing via the pivot mount to allow pivoting relative to the housing about the pivot mount through a range of angular positions. The stand also has a second end with surface engagement areas for engagement with a support surface. A latch arrangement is provided for setting the stand in an angular position relative to the housing to set an angular position of the interaction surface relative to the support surface. The latch arrangement is provided as a resilient engagement member at the stand with an engagement surface and a fixing surface at the housing. The resilient engagement member has an engagement surface normal position and is flexible to move the engagement surface out of the normal position. The resilient engagement surface engages the fixing surface in the normal position to set the stand at an angular position relative to the housing and is movable to adjust the angular position of the stand relative to the housing. The fixing surface and the engagement surface may be directional allowing the stand to pivot in one direction of movement relative to the housing with less flexing of the resilient engagement member than movement of the stand in an opposite direction. A finger catch release may be provided for flexing the resilient engagement member to move the engagement surface out of the normal position to move the stand relative to the housing in the opposite direction. The housing may have a first wall mount and the stand may have a second wall mount. The stand may be pivoted into a wall mount position to provide a two point engagement wall mount.

10 Claims, 10 Drawing Sheets

SINGLE PIECE VERSATILE PHONE STAND

FIELD OF THE INVENTION

The invention relates generally to a telephone unit including a stand that provides multiple telephone configurations. In particular, the invention relates to a telephone console having a multi-position stand for different console angular orientations including a vertical wall mount orientation.

BACKGROUND OF THE INVENTION

Telephone units are typically used in a surface for desk mount configuration or a wall mount configuration for mounting on posts. Manufacturers have attempted to accommodate users by providing single telephone units with both wall mount and desk mount capabilities. For desk mount situations differing users have different requirements as to viewing angle based on the angular orientation of the telephone unit relative to the desk surface.

Various and complicated constructions have been proposed to provide the adjustment in the angular orientation of the telephone unit to the desk surface. These typically have limitations either as to the degree of angular adjustability or present a complicated design which adds cost to manufacturing and adds complexity with regard to use.

U.S. Pat. No. 6,130,944 discloses a multiposition telephone unit with a single piece stand. The stand can be oriented in one of three positions. In one position the telephone unit is set at a small angular position a relative to the desk surface and in a second position of the stand the telephone unit is set in a greater angular position β relative to the desk surface. The stand may be connected in a third position which is adapted for mounting the unit for a wall mount situations. Although the arrangement is simple to use, the arrangement is limited with regard to a finer adjustment of the angular orientation of the telephone to the desk. Further as the stand must be disconnected and reconnected to change the angular orientation, some effort is involved in making the change from the greater angle to the smaller angle and vice verse.

Various manufacturers provide more complex designs to change the angle of the telephone unit (viewing angle). Typically several parts are involved increasing the cost of manufacturing the overall telephone unit. Some arrangements provide for only desk mount adjustment or wall mount adjustment but not both.

SUMMARY OF THE INVENTION

It is an object of the invention to provide a telephone unit with a single piece versatile phone stand which allows simple adjustment of the phone stand to provide a multiplicity of viewing angles for the user in a desk mount situation while also providing a simple structure which easily converts into a wall mount position.

According to the invention, a single piece stand is provided for a telephone unit. The stand is versatile so as to allow the telephone unit to be supported in a desk mount manner in any one of a variety of angular positions and allows a simple operation for changing the viewing angle and the same structure allows for a simple wall mounting.

According to one aspect of the invention, the telephone unit with singe piece stand comprises a housing with a stand pivot mount and a fixing surface. A single piece stand is connected to said housing via the pivot mount for pivoting movement between a first end position and a second end position. The stand includes an resilient engagement member with an engagement surface, the resilient engagement member having an engagement surface normal position and being flexible to move the engagement surface out of the normal position. The resilient engagement member engagement surface engages the housing fixing surface in the normal position to set the stand at an angular position relative to the housing between the first end position and the second end position. The resilient engagement member is movable to adjust the angular position of the stand relative to the housing.

The fixing surface may include a ridge with a leading edge and a trailing edge. The engagement surface may include a plurality of grooves with respective complementary leading and trailing edges (providing teeth). The ridge is received in one of the grooves to latch the resilient engagement member to the housing and set the angular position of the stand relative to the housing.

The leading edge and trailing edge of each of the grooves is shaped to form a rachet structure allowing the ridge to move in and out of the grooves in one direction of movement of the stand relative to the housing with less flexing of the resilient engagement member required than movement of the stand relative to the housing in an opposite direction.

The resilient engagement member may be a latching part with a latching member with a plurality of the grooves provided at regular intervals along an outer surface thereof and a finger catch release for flexing the resilient engagement member to release the ridge form one of the grooves allowing the stand to move relative to the housing. The resilient engagement member may have a first leg and second leg with the latching member connected to each of the first leg and the second leg and the finger catch release centrally disposed between the first leg and the second leg. The finger catch release may have an opening for accommodating a finger of the user of the telephone unit to move the finger catch release for flexing the resilient engagement member to move the engagement surface out of the normal position.

The engagement surface of the stand may be curved. The fixing surface of the housing may be a concave surface for receiving the curved engagement surface and with the ridge protruding from the concave surface.

The housing may have a first wall mount receiving portion. The stand then has an inner surface and an outer surface with a second wall mount receiving portion at the outer surface. The stand pivots into a wall mount position with the inner surface facing the housing and the outer surface facing away from the housing. The second wall mount receiving portion is then spaced a predetermined distance from the first wall mount receiving portion to provide a two point engagement wall mount.

The stand may include cable guides at the stand outer surface.

The pivot mount may be first and second cooperating hinge mounting parts and third and forth cooperating hinge mounting parts. The stand may have a first hinge part seated between the first and second cooperating hinge mounting parts and a second hinge part seated between the third and forth cooperating hinge mounting parts.

According to another aspect of the invention, the telephone unit comprises a housing with a stand pivot mount on a bottom side and with an interaction surface at a top side. A single piece stand is provided with a first end connected to the housing via the pivot mount and pivoting relative to the housing about the pivot mount through a range of angular positions. The stand also has a second end with surface engagement areas for engagement with a support surface. A latch means is provided for setting the stand in an angular position relative to the housing for setting an angular position of the interaction surface relative to the support surface.

The latch means may include a housing latch element formed as part of the housing and a cooperating stand latch element formed integral with the single piece stand. The housing latch element includes one of a tooth and a plurality of teeth and the stand latch element includes the other of the tooth and the plurality of teeth with the tooth being complementary to a groove between the teeth and each of the tooth and the teeth being angled to facilitate pivoting movement between the stand and the housing in one pivotal direction.

According to a preferred embodiment the stand latch element includes a resilient engagement member with an engagement surface having grooves defining the teeth. The resilient engagement member has an engagement surface normal position and is flexible to move the engagement surface out of the normal position. Sidewalls of the grooves are engaged by the tooth of the housing latch element with the engagement surface in the normal position to set the stand at an angular position relative to the housing.

The housing may have a first wall mount receiving portion and the stand may have an inner surface and an outer surface with a second wall mount receiving portion. The stand pivots into a wall mount position with the inner surface facing the housing and the outer surface facing away from the housing and the second wall mount receiving portion spaced a predetermined distance from the first wall mount receiving portion to provide a two point engagement wall mount.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
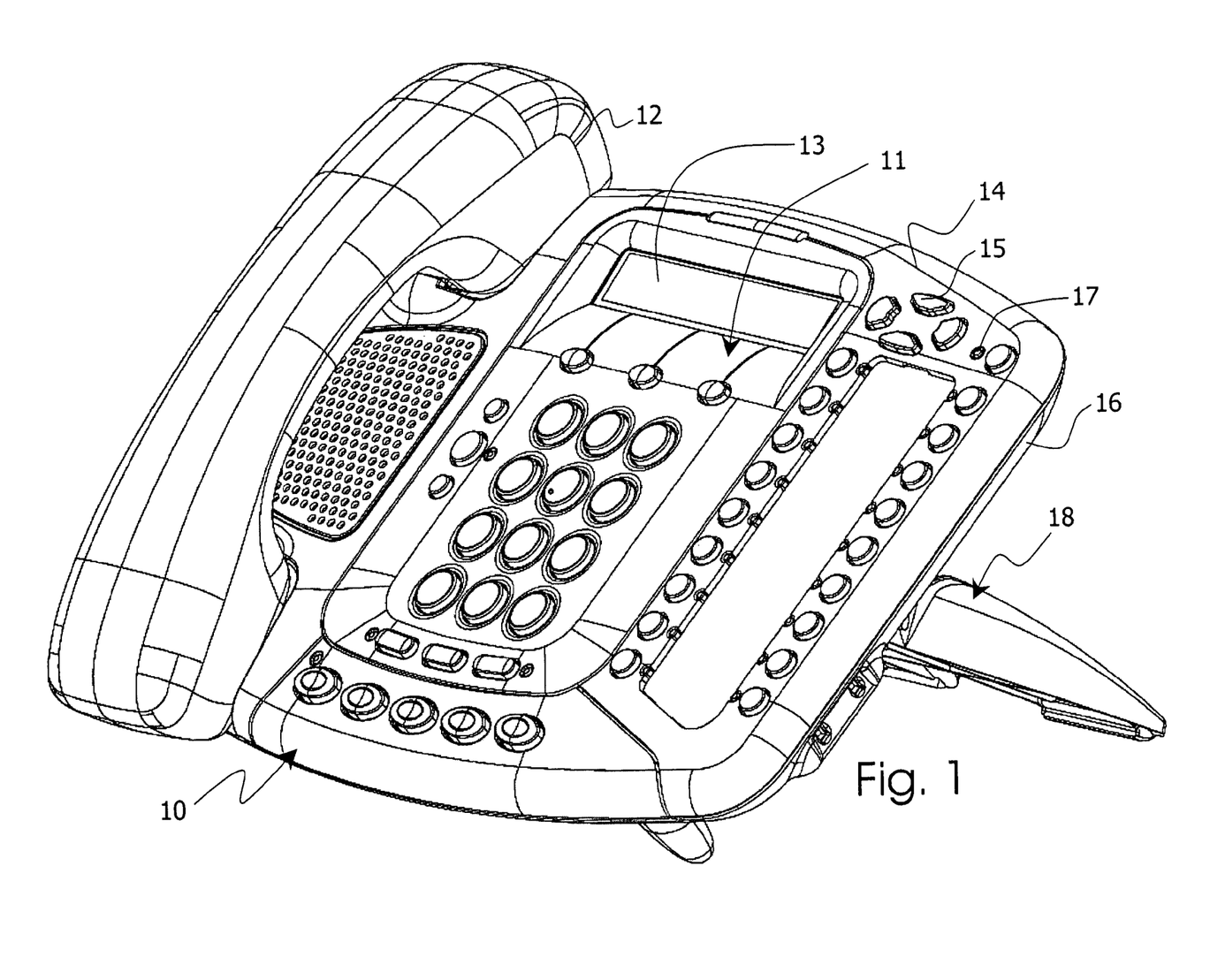
FIG. 1 is a front perspective view of the telephone unit with single piece versatile phone stand according to the invention.

Referring to the drawings in particular, FIG. 1 shows a telephone unit 10 in a desk mount position. The telephone unit 10 includes a housing with a lower housing part 16 and an upper housing part 14. A handset 12 is in a cradled position (on hook position) as shown. The lower housing 16 and upper housing 14 cooperate to present a display surface 11 at the upper side of the upper housing 14. The interaction surface or display surface 11 includes a display window 13, various actuating buttons 15 as well as indicators (e.g., LEDs, lights, etc.) 17. A single piece, versatile phone stand 18 is connected to the lower housing 16. The stand 18 is set in a particular angular position relative to the lower housing 16. This allows the user to change the viewing angle of the display surface 11.

Figure 2:
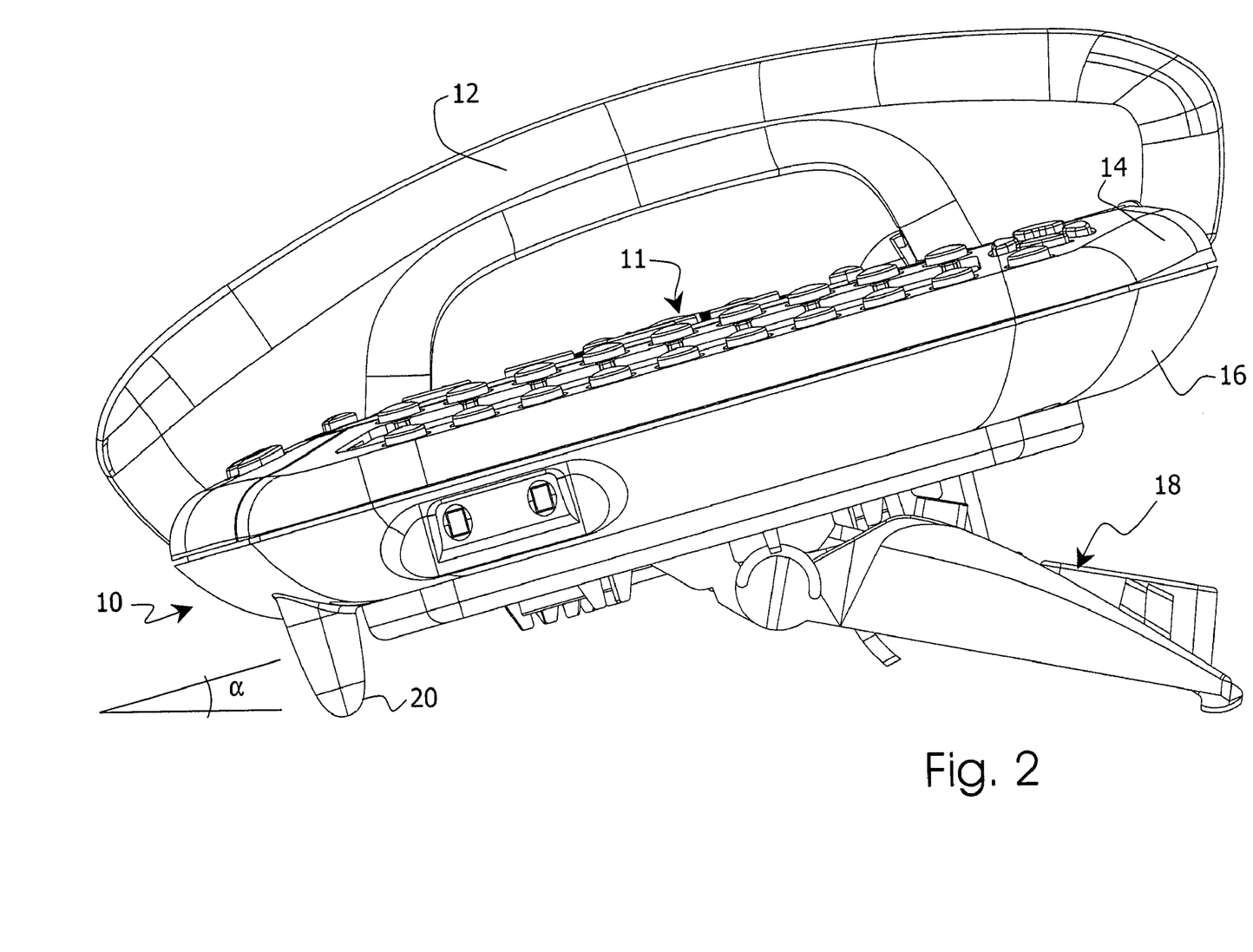
FIG. 2 is a side view of the telephone unit of FIG. 1 with the single piece phone stand in a low angle viewing position for desk mounting.

FIG. 2 shows the phone unit 10 from the side, illustrating one angular position of the stand 18 relative to the lower housing 16, for setting the viewing angle of the phone unit 10. Stand 18 is connected to lower housing 16 such that it can be set in an angular position such as shown. A first setting position among a range of setting positions is shown providing the viewing angle α. The stand 18 and lower housing 16 interact allowing the angle of the lower telephone unit 10 to be adjusted for setting the viewing angle to any one of a plurality of other angular positions.

Figure 3:
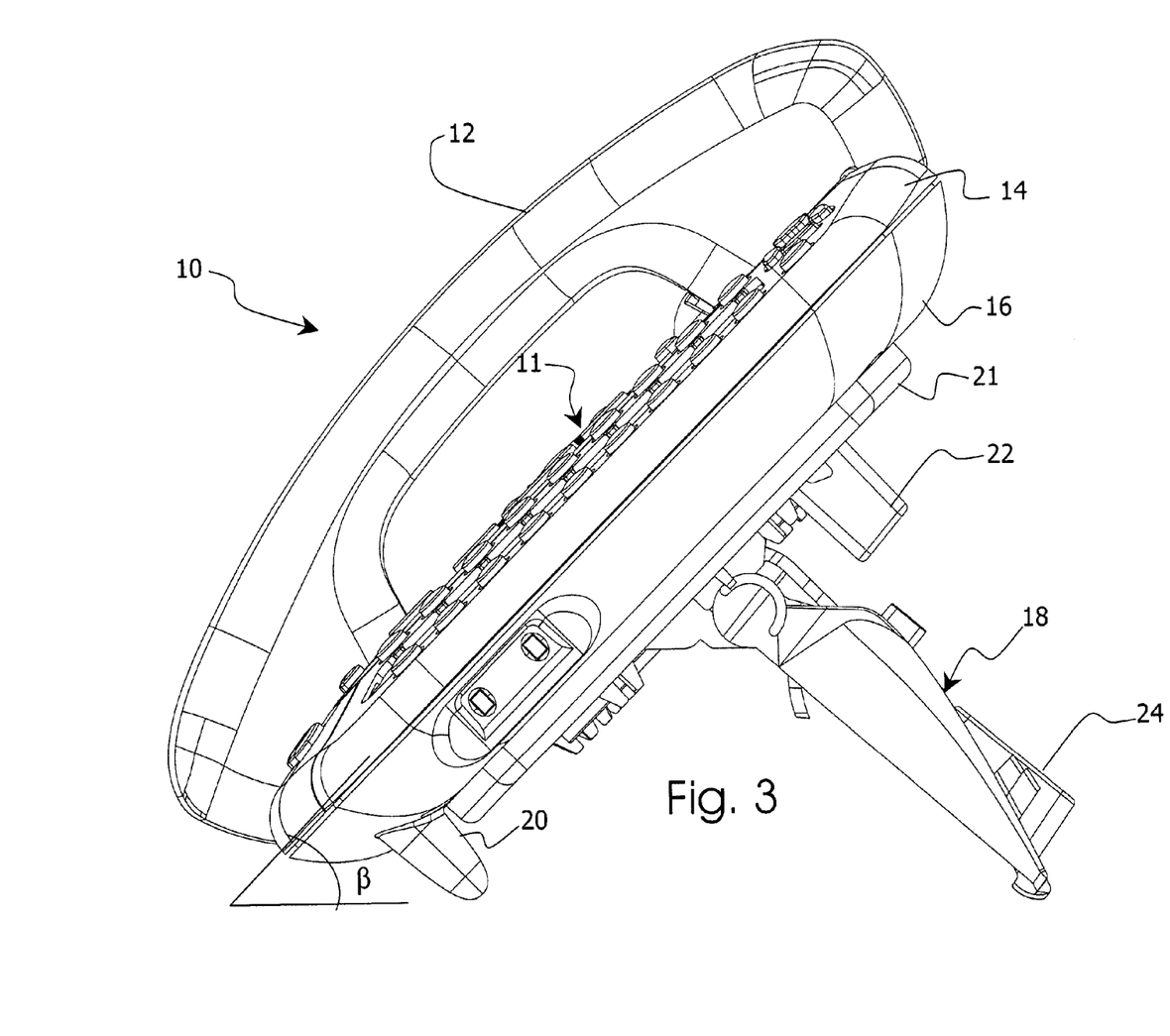
FIG. 3 is a side view of the telephone unit of FIG. 1 with the single piece phone stand in a high angle viewing position for desk mounting.

FIG. 3 shows the telephone unit 10 from the side, illustrating another angular position of the stand 18 relative to lower housing 16. This setting position is a last setting position among the range of setting positions. This provides the viewing angle beta. As can be appreciated from viewing the Figures, the adjustment of the angular position of the stand 18 provides an adjustment of the angular position of the lower surface 21 of the lower housing 16. The display surface 11 in the embodiment shown is generally parallel to the lower surface 21 of the lower housing 16. It can be appreciated that the display surface 11 may be at an angle with respect to the lower surface 21 of the lower housing 16 or be comprised of various different surfaces at different angles. In such case the adjustment of the angular position of stand 18 provides an adjustment of the already angled display surface 11 or the various angled surfaces that comprise the display surface 11.

Figure 4:
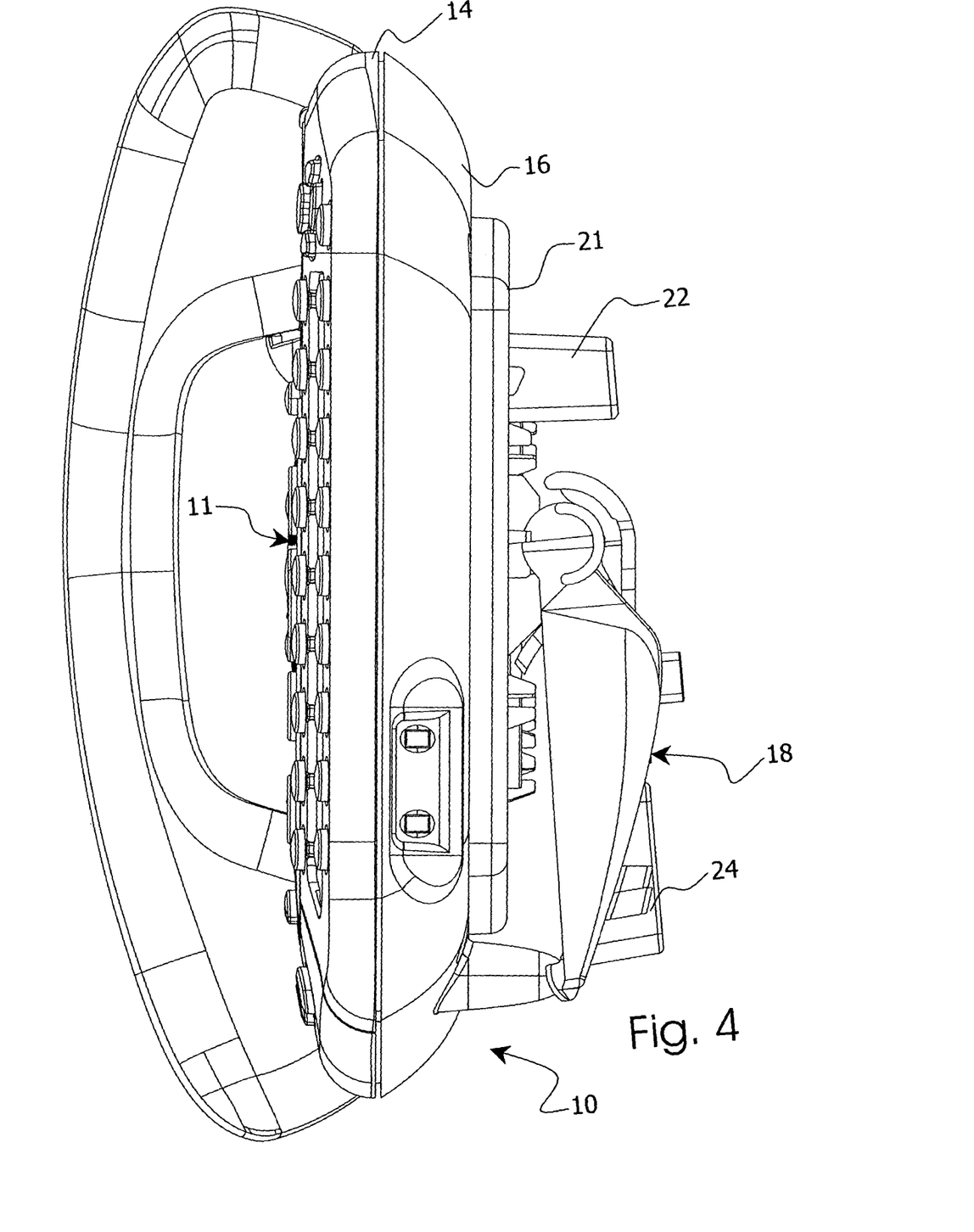
FIG. 4 is a side view of the telephone unit of FIG. 1 with the single piece phone stand in a position for wall mounting.

FIG. 4 shows the telephone unit 10 from the side, illustrating a position of the stand 18 for wall mounting of the telephone unit 10. In this position the inner side of the stand 18 is substantially flush with the lower surface 21. The other side (outer side) of the stand 18 is facing away from lower surface 21. This outer side has a keyhole mount 24 that cooperates with a keyhole mount 22. The keyhole mount 24 and the keyhole mount 22 form the two connection points for wall mounting of the telephone unit 10 to the wall mount posts (not shown). With the stand 18 pivoted as shown in FIG. 4 the display surface 11 is in a desired position for wall mount operations of the telephone unit 10.

Figure 5:
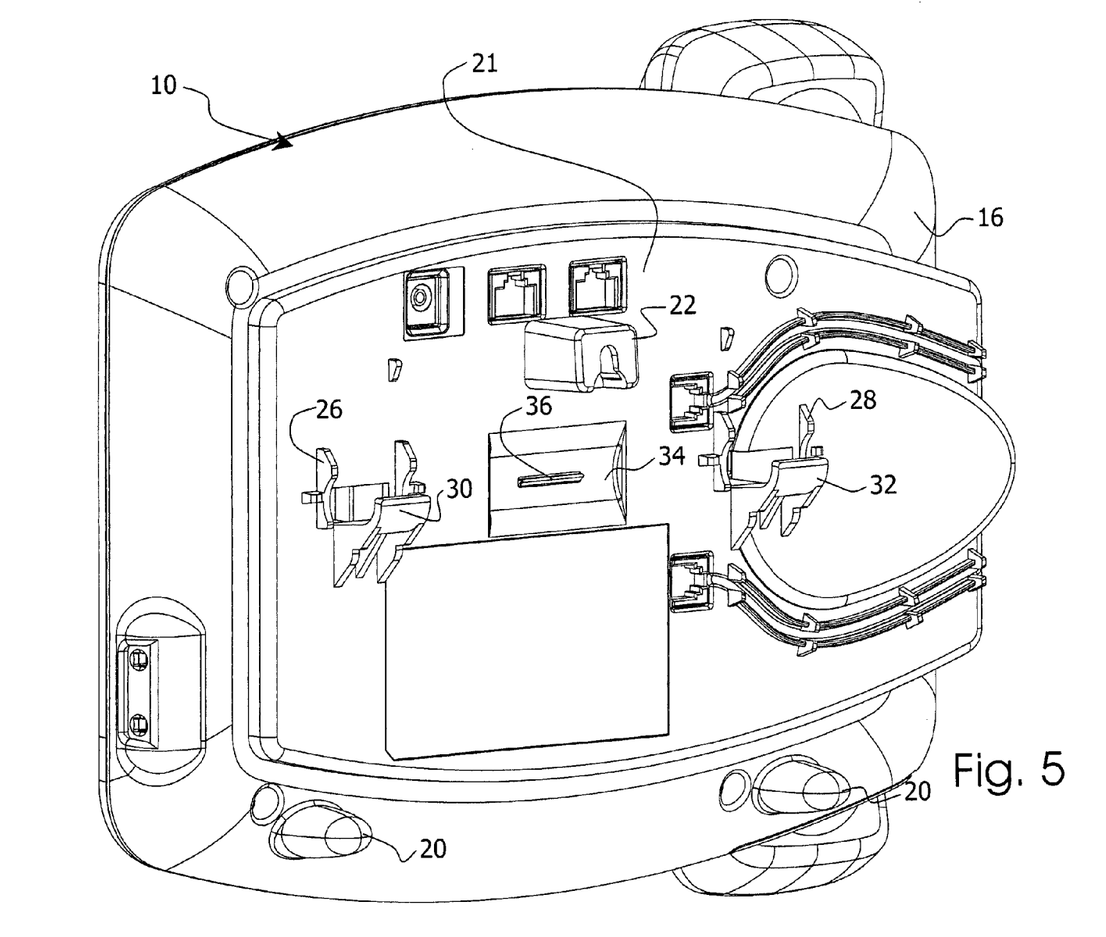
FIG. 5 is a bottom view of the telephone unit of FIG. 1 with the single piece phone stand removed.

FIG. 5 shows the bottom of the telephone unit 10. The lower surface 21 has various features including openings for a power connection as well as jacks including for example, RJ 45 connections for connection to a LAN and to a computer and also RJ 11 connections. Other features of surface 21 include cable management guides and the upper keyhole mount 22. Features are provided for connection of the stand 18 to the lower housing 16. This is providing the form of the pivot structure including a first hinge mount part 26 cooperating with a second hinge mount 30 and a third hinge mount part 28 cooperating with a fourth in mount part 32. The hinge mounting parts are preferably molded as a single piece with the lower housing 16. Between the pairs of cooperating hinge mount parts (26, 30 and 28, 32) a recess 34 is provided. The recess 34 is a generally semicylindrical or concave form with a centrally disposed ridge or tooth 36. The recess 34 with the ridge or single tooth 36 forms a fixing or latching surface of a latching means described further below. The lower housing 16 has, near the lower surface 21, two feet 20. The feet 20 cooperate with the stand 18 for supporting the telephone unit 10 in a desk mount position. The feet 20 also provide support in a wall mount position.

Figure 6:
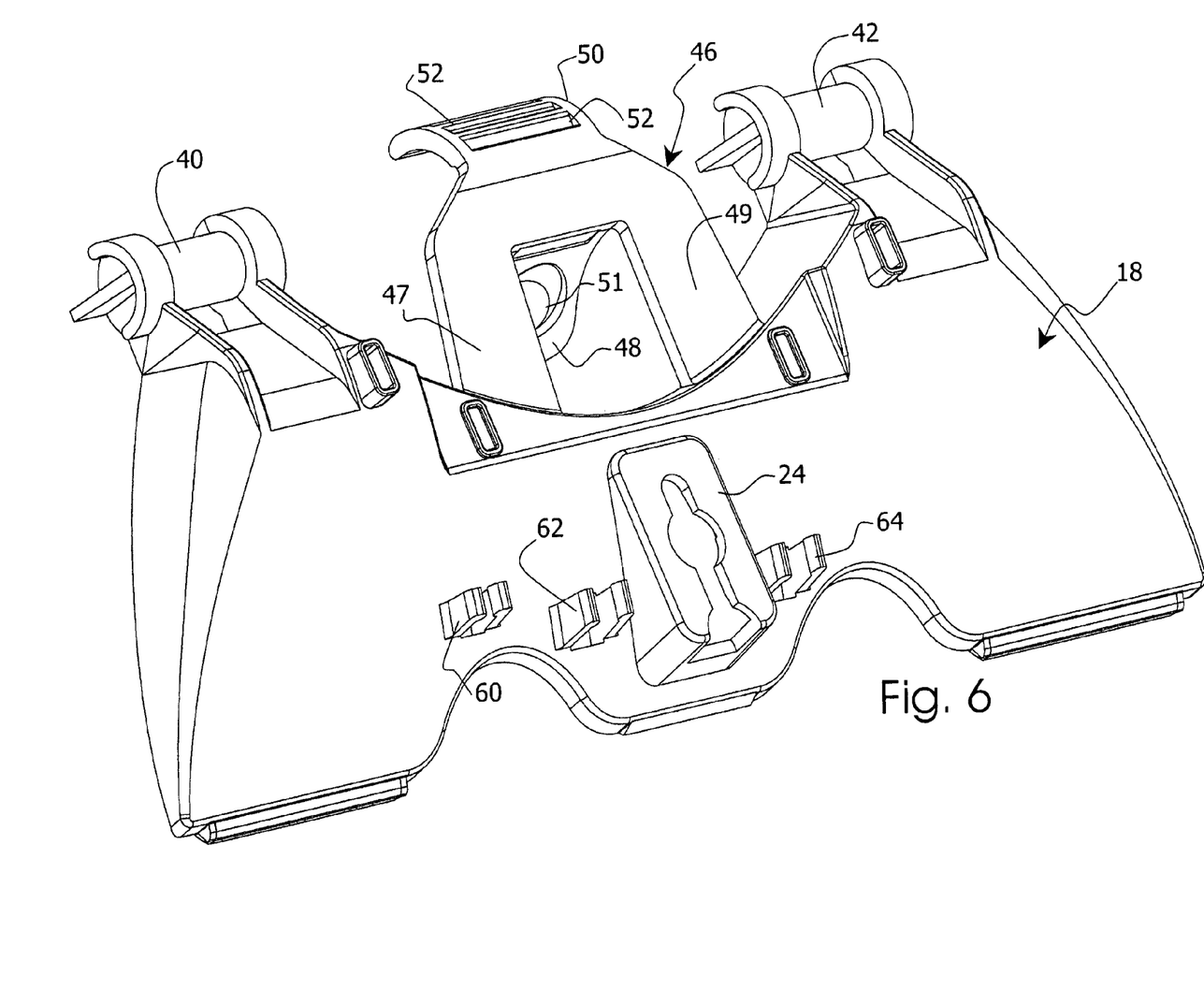
FIG. 6 is a perspective front view of the single piece phone stand detached from the telephone unit.

FIG. 6 shows the stand 18 in a perspective view, showing the outer side of the stand 18. The stand 18 includes a first hinge part 40 which cooperates with hinge mounting parts 26 and 30 of the lower housing 16. A second hinge part 42 is provided that cooperates with hinge mounting parts 28 and 32 of the lower housing 16. The stand 18 includes a latching part 46 with a first leg 47 and second leg 49. A latching member 50 is connected to each of the two legs 47 and 49. The latching member 50 has a curved shape with a plurality of grooves (or regions defining teeth) 52 provided at regular intervals along an outer surface thereof. The latching part 46 also includes a finger catch release 48.

The finger catch release 48 is centrally disposed between the two legs 47 and 49. The finger catch release 48 has a centrally disposed opening 51 for accommodating the finger of the user of the phone unit 10. The latching part 46 is structured such that a user can engage the finger catch release 48 at opening 51 with a finger. The moving of the catch release 48 results in the latching member 50 being moved or flexed.

The stand 18 has other features including the lower keyhole mount 24 described above as well as cable management features 60, 62 and 64. The cable management features 60, 62 and 64 allow cables to be held or managed.

Figure 7:
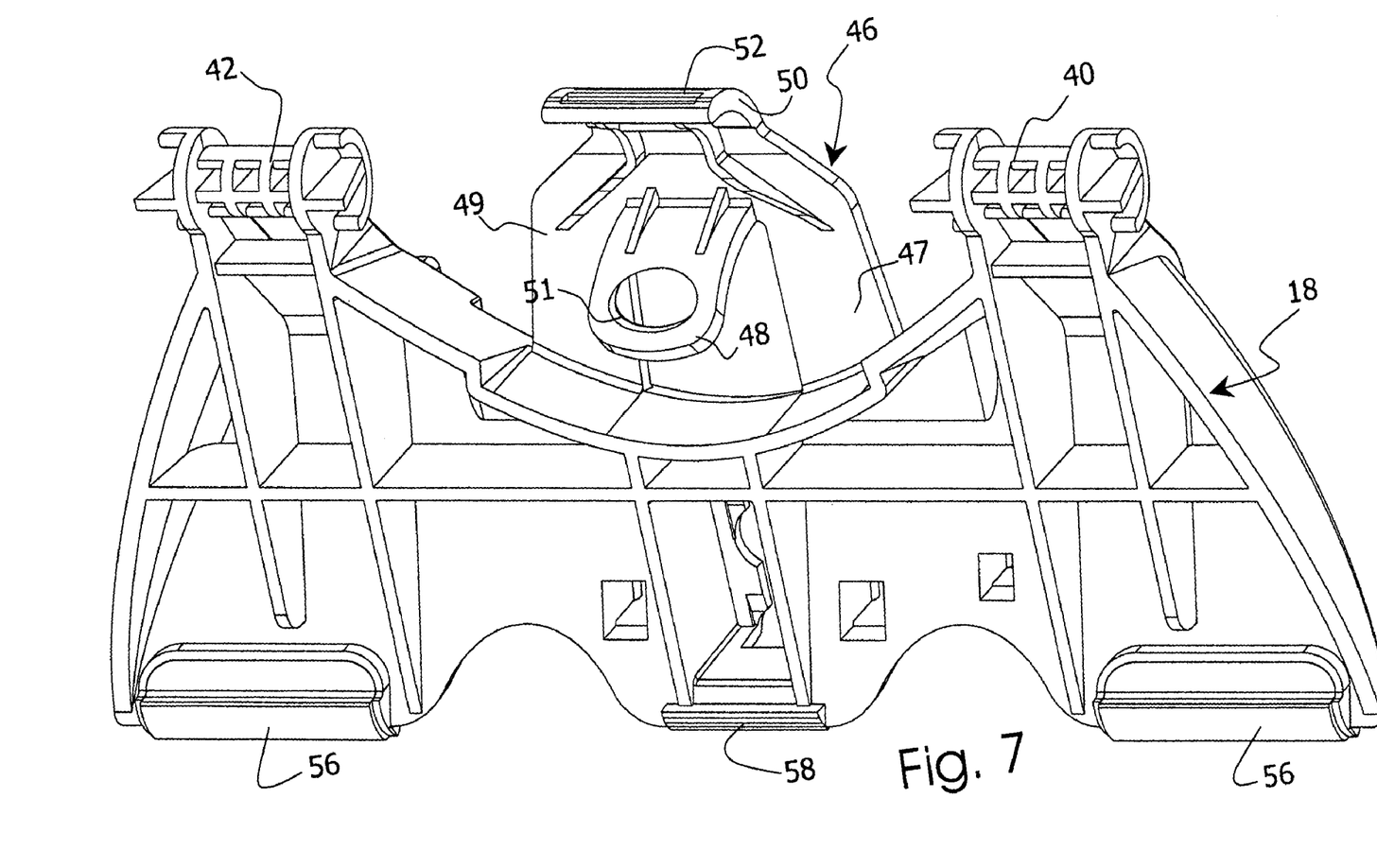
FIG. 7 is a perspective rear view of the single piece phone stand detached from the telephone unit.

FIG. 7 shows the inner side of the stand 18. This view shows pads 56 and central part 58. These pads 56 are thermoplastic elastomer or other plastic with good friction qualities to resist slippage on a smooth surface. These pads 56 may be made of a plastic material and may be over molded after the molding process of the remainder of the stand 18 to provide the stand 18 as a single piece. The pads 56 may also be provided during the formation of the remainder of the stand 18 using a double shot or rotational molding process.

Figure 8:
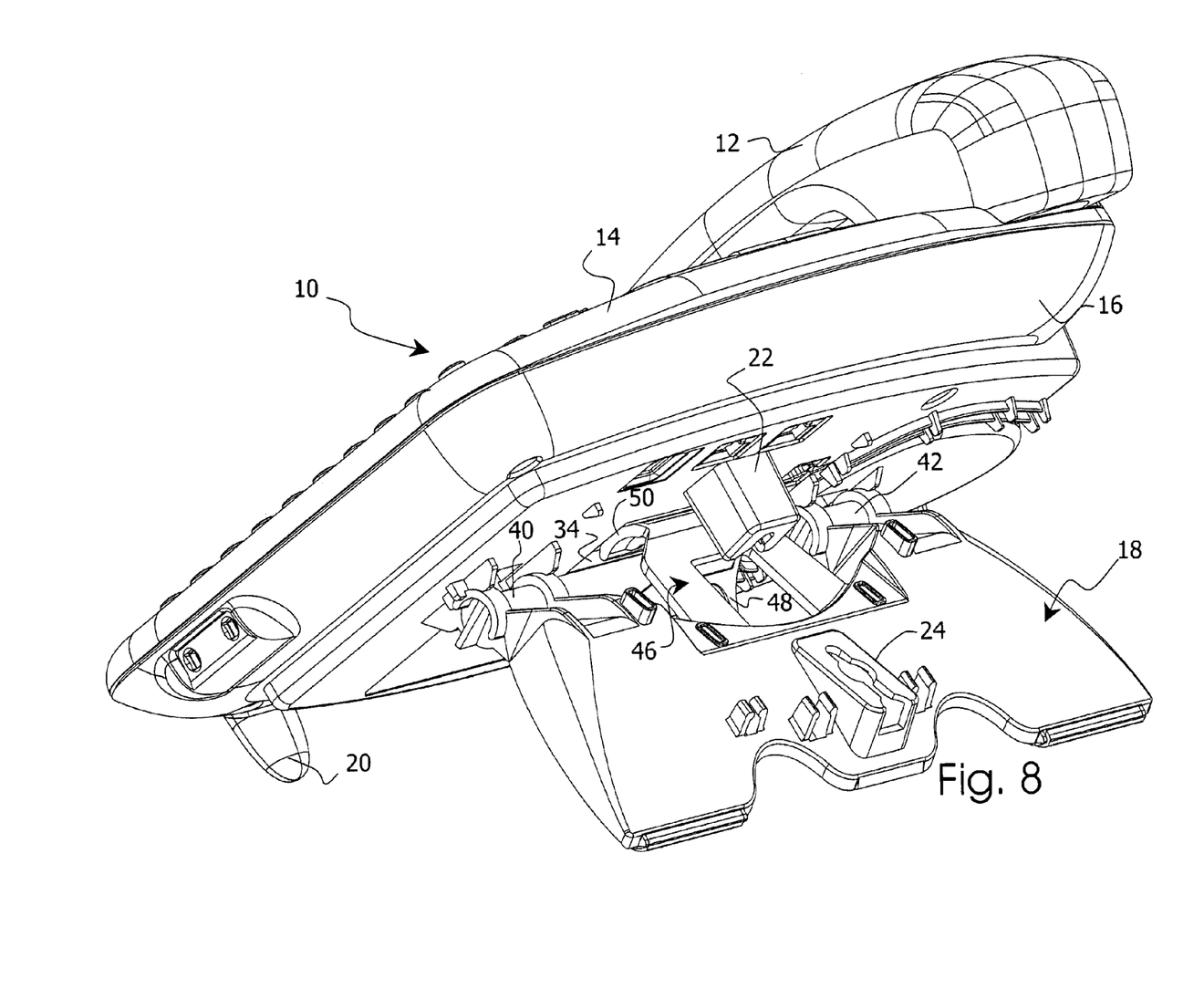
FIG. 8 is a perspective rear view of the telephone of FIG. 1 showing the interconnection of the phone stand and telephone unit housing.

FIG. 8 shows the telephone unit 10 in a rear perspective view. In this view the stand 18 is shown connected to the lower housing 16 with the hinge parts 40 and 42 engaged with cooperating hinge mounting parts 26, 30 and 28, 32. FIG. 8 also shows the latching member 50 disposed in the recess 34. In the position shown in FIG. 8 the function of the cable management features 60 to 62 and 64 can be appreciated, based on their position for guiding cables from the power connection and jacks at the lower surface 21.

Figure 9:
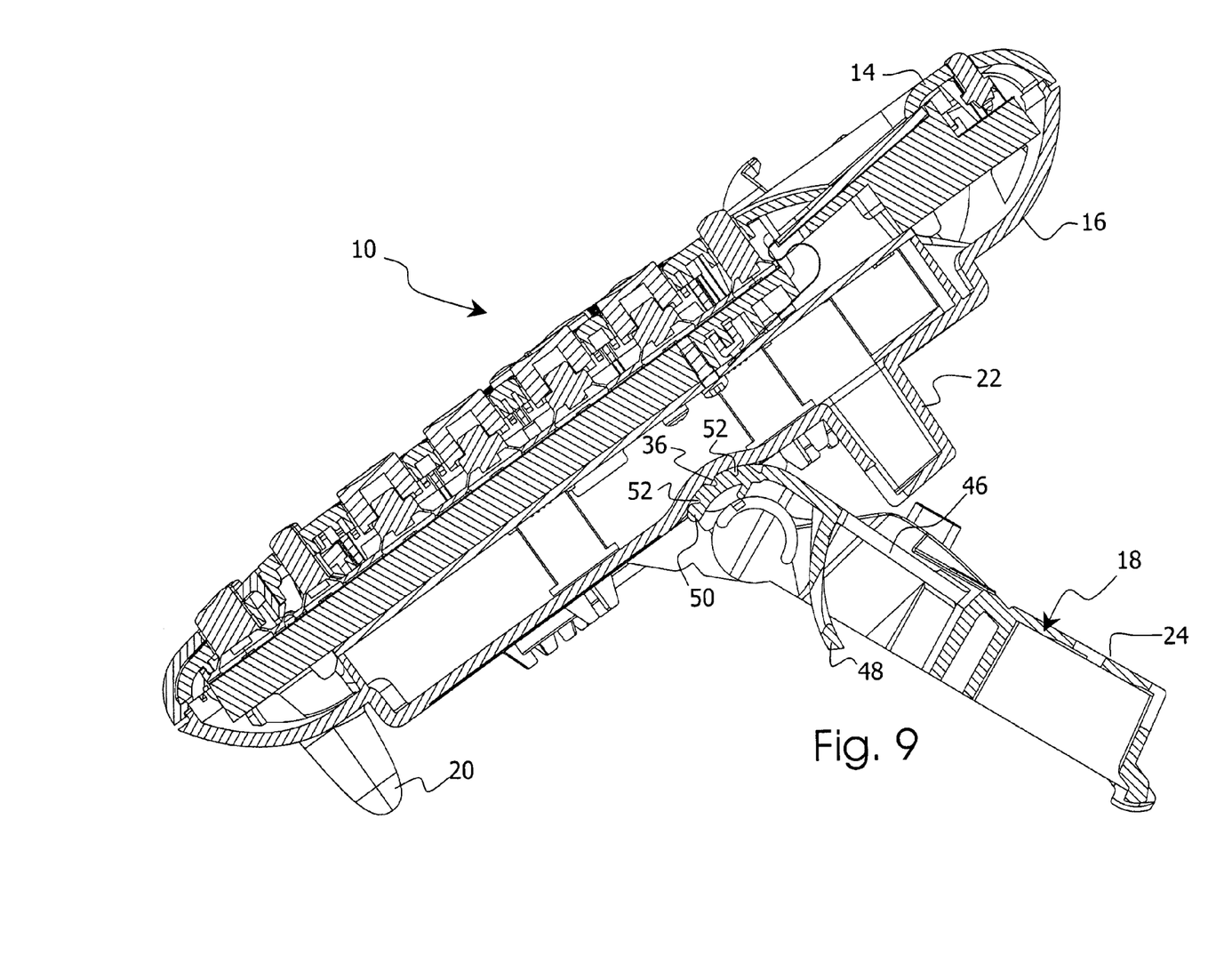
FIG. 9 is a cross sectional view taken through the center of the latch mechanism of the telephone unit of FIG. 1 showing the connection between the single piece phone stand and telephone housing with relative angular adjustment for a multiplicity of viewing angles in a desk mount situation.

FIG. 9 shows the telephone unit 10 in a cross sectional view with the handset 12 not shown (off hook condition). In FIG. 9 the stand 18 is set in an angular position between the position providing viewing angle α and the position providing viewing angle β (see FIGS. 2 and 3). The position is set based or on the latching member 50 extending into the recess 34 with ridge 36 extending into one of the grooves 52. If in the position shown in FIG. 9 the groove 52, into which the ridge 36 extends, is an intermediate groove. This intermediate groove 52 is between an end groove, producing viewing angle α and an end groove producing viewing angle β. As can also be seen from FIGS. 9 and 10 each of the grooves 52 has a shape which cooperates with the shape of ridge 36 (complementary shapes). A front side surface (or leading edge) 70 has a moderate angle which is the same as the angle of the front surface 72 of ridge 36. The rear side surface (or trailing edge) 74 of each groove 52 has a sharper angle, with the rear surface or trailing edge 76 of the ridge 36 having the same sharper angle (almost 90 degrees). The grooves 52 together form a rachet (the grooves 52 form inclined teeth) with the ridge 36 acting as a pawl. The stand 18 is made of a plastic material which is somewhat resilient allowing the latching part 46 to flex and pivot throughout its extent, particularly in the region of the arms 47 and 49. The angular features (ratchet features) of the grooves 52 and 36 are such that the stand 18 can be easily adjusted in one direction without engaging the finger catch release 48. Specifically the stand 18 may be pivoted clockwise (with reference to FIG. 9) without actuating the finger catch release 48. The stand 18 pivots with the latching member 50 moving relative to the recess 34 as the ridge 36 moves out (slips) of one groove 52 and subsequently into an adjacent groove 52, as a result of a pressing of the stand. However, based on the relative angles of the side walls of the grooves 52 and ridge 36, the stand 18 is only moved in the counterclockwise direction (with reference to FIG. 9) by the user engaging the finger latch release 48 at the opening 51. This is done with a pulling motion (rearwardly and upwardly) allowing the ridge 36 to disengage from a groove 52 and be moved into another groove 52. This may also be done to pivot the stand 18 into the wall mount position (see FIG. 4).

Figure 10:
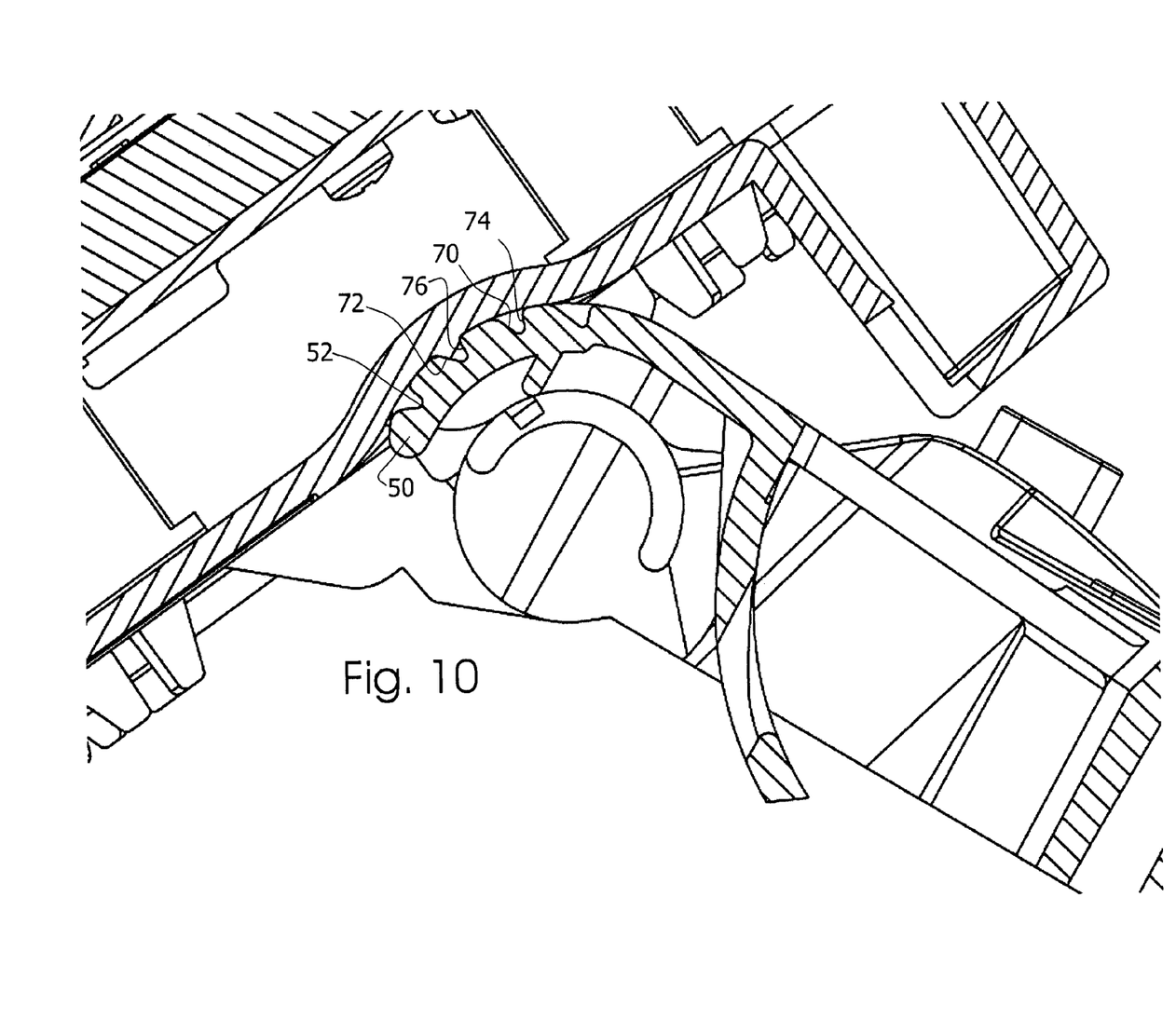
FIG. 10 is sectional view of a detail of FIG. 9 showing the connection between the single piece phone stand and telephone housing with relative angular adjustment for a multiplicity of viewing angles in a desk mount situation.

FIG. 10 shows the tooth or ridge 36 with side walls 72 and 76 interacting with one of the groves 52 with side walls 70 and 74. The angles of the respective surfaces 70, 72, 74 and 76 are selected to allow slipping in one direction but not the other. For example, the sidewalls 70 and 72 are at an angle of 40° with respect to a line extending radially from the center of the pivot 42 (or with respect to the line normal to the curve of latching member 50) and the sidewalls 74 and 76 are at an angle of 5° with respect to a line extending radially from the center of the pivot 42 (or with respect to the line normal to the curve of latching member 50) in the embodiment of FIGS. 1 to 10. The latching engagement will maintain the position of the ridge 36 in one of the grooves 52 unless the force is applied to provide a slipping into an adjacent groove or the finger latch release 48 is actuated.

While specific embodiments of the invention have been shown and described in detail to illustrate the application of the principles of the invention, it will be understood that the invention may be embodied otherwise without departing from such principles.

What is claimed is:

1. A telephone unit, comprising:
   a housing with a stand pivot mount with a spaced apart first housing hinge mount and second housing hinge mount and a fixing surface disposed between said spaced apart first hinge mount and said second hinge mount; and
   a single piece stand with a spaced apart stand first hinge part and stand second hinge part connected respectively to said housing via said pivot mount spaced apart first hinge mount and second hinge mount for pivoting movement between a first end position and a second end position, said stand including a centrally located resilient engagement member with an engagement surface at a location between said first hinge part and said second hinge part, said resilient engagement member having an engagement surface normal position and being flexible to move said engagement surface out of said normal position, said resilient engagement member engagement surface for engaging said fixing surface in said normal position to set said stand at an angular position relative to said housing from a plurality of settable positions between said first end position and said second end position and being movable to adjust the angular position of said stand relative to said housing.

2. A telephone unit according to claim 1, wherein said fixing surface includes a ridge with a leading edge and a trailing edge and said engagement surface includes a plurality of grooves with respective complementary leading and trailing edges, said ridge being received in one of said grooves to latch said resilient engagement member to said housing and set an angular position of said stand relative to said housing.

3. A telephone unit according to claim 2, wherein said leading edge and trailing edge of each of said grooves are shaped to form a rachet structure allowing said ridge to move in and out of said grooves in one direction of movement of said stand relative to said housing with less flexing of said resilient engagement member than movement of said stand relative to said housing in an opposite direction.

4. A telephone unit according to claim 3, wherein said resilient engagement member comprises a latching part with a latching member with a plurality of said grooves provided at regular intervals along an outer surface thereof and a finger catch release for flexing said resilient engagement member to release said ridge from one of said grooves allowing said stand to move relative to said housing.

5. A telephone unit according to claim 4, wherein said resilient engagement member has a first leg and second leg with said latching member connected to each of said first leg and said second leg and said finger catch release is centrally disposed between said first leg and said second leg.

6. A telephone unit according to claim 4, wherein said finger catch release has an opening for accommodating a finger of the user of the telephone unit to move said finger catch release for flexing said resilient engagement member to move said engagement surface out of said normal position.

7. A telephone unit according to claim 4, wherein said engagement surface is curved and said fixing surface includes a concave surface for receiving said curved engagement surface with said ridge protruding from said concave surface.

8. A telephone unit according to claim 4, wherein said housing has a first wall mount receiving portion and said stand has an inner surface and an outer surface with a second wall mount receiving portion, said stand pivoting into a wall mount position between said first end position and said second end position but outside of a range of said settable positions with said inner surface facing said housing in said wall mount position and said outer surface facing away from said housing in said wall mount position and said second wall mount receiving portion spaced a predetermined distance from said first wall mount receiving portion in said wall mount position to provide a two point engagement wall mount, said inner surface facing a support surface for each of said settable positions between said first end position and said second end position.

9. A telephone unit according to claim 1, wherein said first housing pivot mount comprises first and second cooperating hinge mounting parts and said second housing hinge mount comprises third and fourth cooperating hinge mounting parts and said stand first hinge part is seated between said first and second cooperating hinge mounting parts and said stand second hinge part is seated between said third and fourth cooperating hinge mounting parts.

10. A telephone unit according to claim 1, wherein said stand includes a cable guide.

\* \* \* \* \*